United States Patent [19]

Moroto et al.

[11] Patent Number: 5,378,198
[45] Date of Patent: Jan. 3, 1995

[54] CONTINUOUS V-BELT TRANSMISSION

[75] Inventors: Shuzo Moroto, Nagoya; Shiro Sakakibara, Anjo, both of Japan

[73] Assignee: Aisin Aw Co., Ltd., Japan

[21] Appl. No.: 102,904

[22] Filed: Aug. 6, 1993

[30] Foreign Application Priority Data

Aug. 7, 1992 [JP] Japan .................................. 4-233015

[51] Int. Cl.$^6$ ............................................. F16H 59/00
[52] U.S. Cl. ................................................ 474/8; 474/30
[58] Field of Search ................... 474/8, 11, 12, 29, 30, 474/37, 69-72

[56] References Cited

U.S. PATENT DOCUMENTS

| | | | |
|---|---|---|---|
| 2,609,700 | 9/1952 | Montemarani | 474/29 |
| 4,380,444 | 4/1983 | Dolza | 474/30 X |
| 4,735,598 | 4/1988 | Moroto et al. | 474/30 X |
| 4,950,208 | 8/1990 | Tomlinson | 474/29 X |

*Primary Examiner*—Thuy M. Bui
*Attorney, Agent, or Firm*—Lorusso & Loud

[57] ABSTRACT

A continuous V-belt transmission comprising: a primary pulley and a secondary pulley individually including two sheaves supported on shafts and made axially movable relative to each other; a belt made to run on the two pulleys; mechanical actuators individually including first members and second members for moving the movable sheaves of the two pulleys on the basis of the relative rotations of the two members: and pressure regulating mechanisms for applying an axial force corresponding to a transmission torque to at least one of the pulleys. In an unshifted state, the rotations of the pulleys are transmitted from the externally threaded portions integrated with the movable sheaves to the carriers of the planetary gear mechanisms so that they are transmitted through the ring gears to toe internally threaded portions on the basis of the sun gears being stopped. At this time, the externally threaded portions and the internally threaded portions are rotated integrally with the pulleys at the same r.p.m. If the sun gears are rotated through the shafts by the shift motor, the externally threaded portions and the internally threaded portions are rotated relative to each other to effect the shifting operation. At this time, the stroke of a ball screw unit is caused to match the stroke of the movable sheaves by non-circular gears.

2 Claims, 8 Drawing Sheets

CONTINUOUS V-BELT TRANSMISSION

BACKGROUND OF THE INVENTION

1. Field of the Invention

The present invention relates to a continuous V-belt transmission having a belt made to run on primary and secondary pulleys each composed of two sheaves and, more particularly, to a shift control unit for a continuous V-belt transmission to be suitably mounted on an automobile, for shifting the primary and secondary pulleys.

2. Description of the Prior Art

In recent years, with demands for improving the fuel consumption rate and the drivability, there has been noted an automatic transmission for an automobile, which is equipped with the continuous V-belt transmission.

In the prior art, we have proposed continuous V-belt transmissions in Japanese Patent Laid-Open Nos. 13853/1987, 159847/1987, 159848/1987 and 154848/1990, for example. These continuous V-belt transmissions change the speeds by using mechanical actuators such as ball screw units as actuators for moving the movable sheaves of the primary and secondary pulleys in the axial directions, by equipping the two pulleys with pressure regulating cam mechanisms for applying belt clamping forces corresponding to a transmission torque, by associating the primary and secondary actuators through power transmission units such as gears, and by connecting shift control means to the power transmission units to rotate the primary and secondary actuators relative to each other.

Especially in the continuous V-belt transmission disclosed in Japanese Patent Laid-Open No. 159847/1987: the primary ball screw unit has its externally threaded portion formed in the movable sheave of the primary pulley; the externally threaded portion is connected through the carrier of the planetary gear mechanism to the externally threaded portion of the secondary ball screw unit; the primary ball screw unit has its internally threaded portion connected through the ring gear of the planetary gear mechanism to the internally threaded portion of the secondary ball screw unit; and the shift control means is connected to the sun gear of the planetary gear mechanism.

As a result, in an unshifted state, the primary ball screw unit rotates together with the pulley, and the rotations of the externally threaded portion and the internally threaded portion of the ball screw unit are transmitted through the individual elements of the planetary gear mechanisms to the externally threaded portion and the internally threaded portion of the secondary ball screw unit thereby to maintain a predetermined shifted state. By rotating the sun gear of the planetary gear mechanism on the basis of the operation of the shift control means, moreover, the primary and secondary ball screw units are rotated relatively to each other to establish a desired shift value.

As a result, in this continuous V-belt transmission, when the primary pulley and the secondary pulley are in the one-to-one relation, that is, rotating at an equal r.p.m., the secondary pulley and the ball screw unit are in the equal r.p.m. sate like the primary side so that a plurality of thrust bearings arranged for bearing the axial force of the pulley by the shaft are integrally rotating. In case the primary pulley and the secondary pulley are not in the one-to-one relation, their relative rotations are lower to reduce the loading capacity of the bearings the more than those of the construction in which the ball screw unit has one of its externally threaded portion and the internally threaded portion blocked from any rotation.

The continuous V-belt transmission described above has a smaller loading capacity of the thrust bearings than that of the construction in which the mechanical actuator such as the ball screw unit does not rotate together with the primary and secondary pulleys. At the secondary side, the thrust bearings arranged for bearing the axial force of the pulleys by the shaft have to be given a capacity more than that for allowing the relative rotating load. Thus, the continuous transmission has its transmission efficiency dropped to an extent corresponding to the spin lose of the bearings, and a large bearing space is required to obstruct the compact construction.

Moreover, since both the primary and secondary ball screw units are always in an associated state to transmit the rotation, it is impossible to interpose any nonlinear transmission means between the two ball screw units. As a result, at each torque ratio, the stroke difference specified by the belt between the primary movable sheave and the secondary movable sheave cannot be absorbed by the movements of the ball screw units. In the aforementioned continuous transmission, therefore, the pressure regulating cam mechanism takes a large stroke to establish the torque fluctuation and to deteriorate the durability and performance of the pressure regulating cam mechanism when the positive and negative torque are switched to a negative torque transmission for an engine braking.

SUMMARY OF THE INVENTION

Therefore, an object of the present invention is to provide a continuous V-belt transmission which is enabled to solve the above-specified problems by rotating both the primary and secondary mechanical actuators together with the primary and secondary pulleys to rotate the thrust bearings arranged for bearing the axial forces of the pulleys by the shafts, altogether in an unshifted state thereby to improve the transmission efficiency and to make a compact construction and by interposing nonlinear transmission means between the two mechanical actuators to match the stroke of the movable sheave by the stroke of the mechanical actuators.

According to an aspect of the present invention, there is provided a continuous V-belt transmission (1) which comprises: a primary pulley (5) and a secondary pulley (6) individually including two sheaves (7) and (9), and (33) and (35) supported on shafts (2) and (3) and made axially movable relative to each other; a belt (B) made to run on said two pulleys; mechanical actuators (21) and (50) individually including first members (24) and (45) and second members (23) and (46) for moving the movable sheaves (7) and (33) of said two pulleys on the basis of the relative rotations of said two members; and pressure regulating mechanisms (11) and (43) for applying an axial force corresponding to a transmission torque to at least one of said pulleys, wherein said primary pulley (5) has its movable sheave (7) connected axially movably but relatively unrotatably to said stationary sheave (9) and its one (7) of said movable sheave and said stationary sheave connected rotatably together to one (22) of the first and second members of said primary mechanical actuator (21), wherein said secondary pulley (6) has its movable sheave (33) connected axially movably but relatively unrotatably to said stationary sheave (35) and its one (33) of said movable sheave and said stationary sheave connected rotatably together to one (45) of the first and second members of said secondary mechanical actuator (50), wherein there are arranged planetary gear mechanisms (66) and (71) individually including first elements ($C_1$) and ($C_2$), second elements ($R_1$) and ($R_2$) and third elements ($S_1$) and ($S_2$), wherein said primary planetary gear mechanism (66) has its first element ($C_1$) connected to one (22) of the first member and the second member of said primary mechanical actuator and its second element ($R_1$) connected to the other (23) of said mechanical actuator (21) so that the first and second members (22) and (23) of said mechanical actuator may rotate at the same r.p.m. when said planetary gear mechanism has its third element ($S_1$) in the stop state, wherein said secondary planetary gear mechanism (71) has its first element ($C_2$) connected to one (45) of the first member and the second member of said secondary mechanical actuator and its second element ($R_2$) connected to the other (46) of said mechanical actuator (50) so that the first and second members (45) and (46) of said mechanical actuator may rotate at the same r.p.m. when said planetary gear mechanism has its third element ($S_2$) is in the stop state, and wherein said primary planetary gear mechanism (66) and said secondary planetary gear mechanism (71) have their third elements ($S_1$) and ($S_2$) connected to each other and to shift control means (M).

According to another aspect of the present invention, said primary planetary gear mechanism (66) and said secondary planetary gear mechanism (71) have their third elements ($S_1$) and ($S_2$) connected to each other through nonlinear power transmission means (64).

With the construction described above, the rotation of the primary pully (5) is transmitted through the belt (B) to the secondary pully (6). In the unshifted state, moreover, the rotations of the pulleys (5) and (6) are transmitted from the one members (22) and (45) integrated with the movable sheaves (7) and (33) to the first elements ($C_1$) and ($C_2$) of the planetary gear mechanisms (66) and (71) and further through the second elements ($R_1$) and ($R_2$) to the other members (23) and (46). At this time, those one and other members rotate at the same r.p.m., and the mechanical actuators (21) and (50) are held in predetermined positions without the relative rotations of the first and second members so that the primary and secondary pulleys (5) and (6) maintain their predetermined effective diameters. On the basis of the pressure regulating mechanisms (11) and (43), the axial forces acting to apply the belt clamping forces to the pulleys (5) and (6) are borne by the shafts (2) and (3) through the mechanical actuators (21) and (590) and the thrust bearings (26), (32), (55) and (53), which are rotating altogether.

If the shift control means (M) is rotated, the third elements ($S_1$) and ($S_2$) of the primary and secondary planetary gear mechanisms (66) and (71) are rotated to rotate the first members (22) and (36) and the second members (23) and (46) of the mechanical actuators (21) and (50) so that the movable sheaves (7) and (33) are moved to change the effective diameters of the pulleys (5) and (6). At this time, the rotation of the shift control means (M) is transmitted to the third element ($S_3$) of one planetary gear mechanism (71) through the nonlinear transmission means (64), for example, so that the moving strokes of the primary and secondary pulleys (5) and (6) can match the nonlinear stroke specified by the belt (B).

Incidentally, the foregoing parenthesized reference numerals are provided to provide references to the drawings (especially to FIG. 1) but should be understood that they will no restriction upon the construction of the present invention.

DESCRIPTION OF THE PREFERRED EMBODIMENTS

Figure 1:
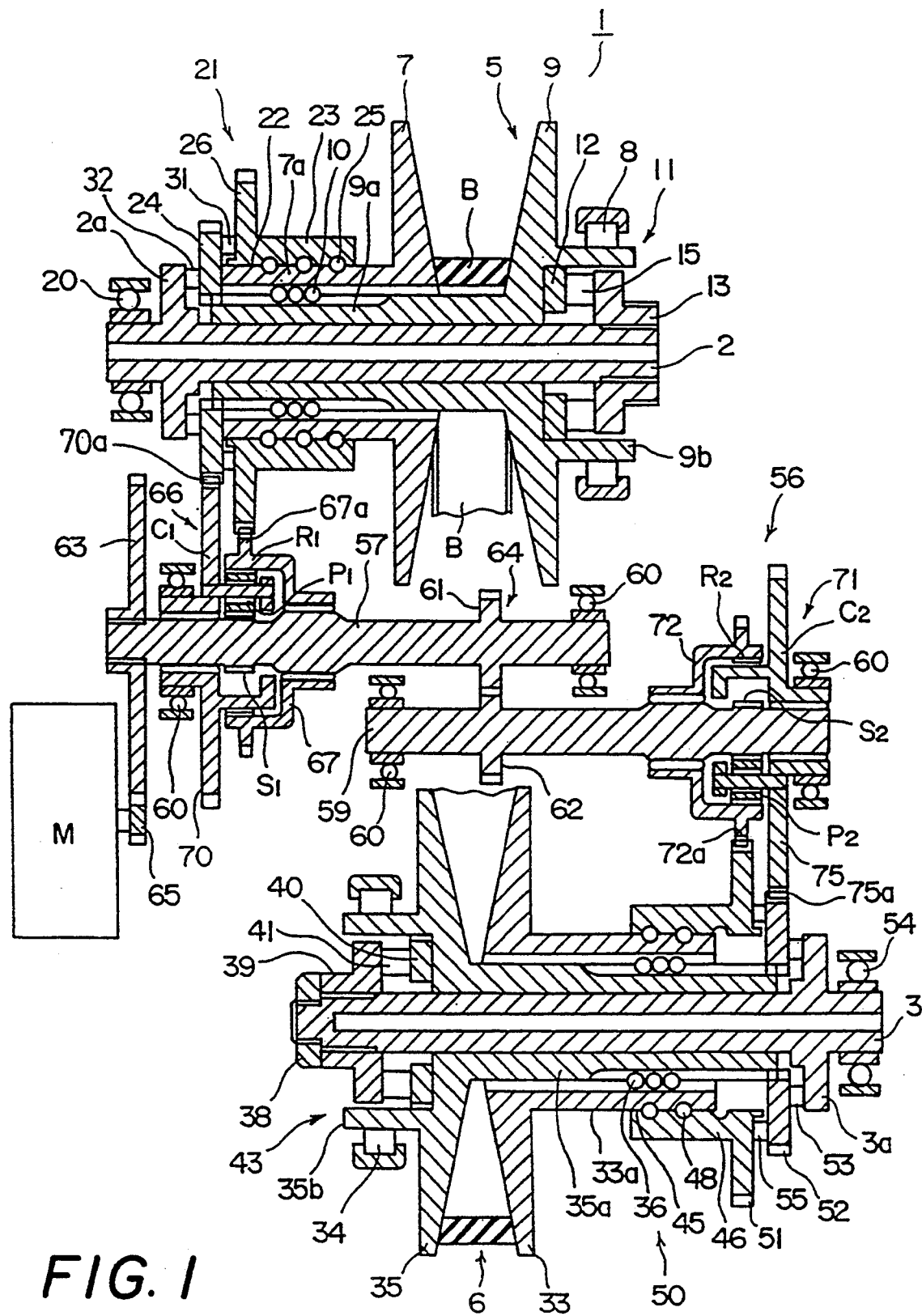
FIG. 1 is a section showing a first embodiment.

A continuous V-belt transmission 1 according to a first embodiment is equipped, as shown in FIG. 1, with a primary shaft 2 associated with an engine and a secondary shaft 3 associated with wheels. A primary pulley 5 is mounted on the primary shaft 2 whereas a secondary pulley 6 is mounted on the secondary shaft 3. An endless belt B is made to run on those pulleys 5 and 6. The primary pulley 5 is composed of a movable sheave 7 and a stationary sheave 9 which are made axially movable relative to each other. The stationary sheave 9 has its boss 9a fitted rotatably and slidably on the shaft 2, and the movable sheave 7 has its boss 7a fitted only slidably through a ball spline 10. From the back of the stationary sheave 9, moreover, there is projected an annular flange 9b, on which is mounted a radial roller bearing 8 while being supported by a (not-shown) casing. In the flange 9b at the back of the stationary sheave 9, there is fitted a pressure regulating cam mechanism 11. This pressure regulating cam mechanism 11 is composed of a movable race 12 formed on the stationary sheave back, and a stationary race 13 and a plurality of taper rollers 15 fixed on the shaft 2. These two races 12 and 13 have their opposed end faces corrugated to hold the rollers 15 inbetween so that an axial force to act upon the sheave is established on the basis of the torque transmitted between the two races 12 and 13.

On the other hand, the shaft 2 has its leading end portion formed with a stepped bulging portion 2a and supported by the casing through a bearing 20. Between the bulging portion 2a and the flange back of the movable sheave 7, there is interposed a ball screw unit 21 which constitutes a mechanical actuator. The ball screw unit 21 is composed of an externally threaded portion 22 forming a first member, an internally threaded portion 23 forming a second member, and a multiplicity of balls 25 sandwiched between these two members. The externally threaded portion 22 is integrated with the boss 7a of the movable sheave 7. On the leading end portion of the stationary sheave boss 9a, there is integrally fixed a gear 24 which is fitted in a ball spline, and the internally threaded portion 23 is integrally equipped with a large-diameter gear 26. A thrust bearing 31 is sandwiched between the two gears 24 and 26, and a thrust bearing 32 is sandwiched between the gear 24 and the bulging portion 2a. On the basis of the force acting always in the expanding direction of the movable sheave 7 by the belt B, both the gear 24 held between the movable sheave 7 and the bulging portion 2a of the shaft 2 and the gear 26 made integral with the internally threaded portion are supported in predetermined positions only rotatably while being blocked from any axial movement.

On the other hand, the secondary pulley 6 is equipped with two sheaves 33 and 35, of which the stationary sheave 35 has its boss 35a fitted rotatably and slidably on the shaft 3 whereas the movable sheave 33 has its boss 33a fitted only slidably through a ball spline 36. Like the primary pulley 5, moreover, from the flanged back of the stationary sheave 35, there is projected an annular flange 35b, on which is fitted a radial roller bearing 34. This radial roller bearing 34 is supported by a (not-shown) casing. In the flange 35b at the back of the stationary sheave 35, moreover, there are disposed a stationary race 39 which is fixed by a nut 38 on the leading end of the shaft 3, a movable race 40 which is fixed on the stationary sheave 35, and a pressure regulating cam mechanism 43 which is composed of rollers 41 sandwiched the corrugated end faces of those two races. The boss 33a at the flange back of the movable sheave 33 is formed in its outer circumference with an externally threaded portion 45, which is screwed in an internally threaded portion 46 through a multiplicity of balls 48, to construct a ball screw unit 50 acting as a mechanical actuator. Moreover, the internally threaded portion 46 is formed integrally with a gear 51 which has the same tooth number as that of the gear of the internally threaded portion 23 at the primary side described above. On the leading end portion of the stationary sheave boss 35a, there is fixed a gear 52 which is fitted in the ball spline. This gear 52 is given the same tooth number as that of the gear 24 which is made rotatable together with the primary side internally threaded portion 22. The shaft 3 is formed integrally with the stepped bulging portion 3a. A thrust bearing 53 is sandwiched between the bulging portion 3a and the gear 52, and a thrust bearing 55 is sandwiched between the two gears 51 and 52. The shaft is supported at the base end from the bulging portion 3a by the (not-shown) casing through a thrust bearing 54. As a result, the gear 52 and the gear 51 integrated with the internally threaded portion 45 are positioned in axially predetermined positions by the axial force of the pressure regulating cam mechanism 43.

A shift unit 56 is arranged in a position to form a triangle with the primary and secondary shafts 2 and 3. The shift unit 56 is equipped with primary and secondary counter shafts 57 and 59 which are arranged in parallel. These shafts 57 and 59 are individually supported through bearings 60 in the casing. On these shafts 57 and 59, there are respectively fixed non-circular gears 61 and 62 which are meshing with each other to constitute nonlinear transmission means 64. On one end of the primary counter shaft 57, moreover, there is fixed a larger-diameter gear 63 which is meshing with a smaller-diameter gear 65 fixed on the output shaft of a shift motor M.

The primary counter shaft 57 is arranged with a planetary gear mechanism 66. This gear mechanism 66 is composed of: a ring gear $R_1$ (to constitute a second element) which is rotatably borne on the counter shaft 57 through a needle bearing; a carrier $C_1$ (to constitute first element) which is rotatably borne on the shaft 57 through a needle bearing; a sun gear $S_1$ (to constitute a third element) which is formed at the shaft 57; and a pinion $P_1$ which is supported by the carrier $C_1$ meshing with the ring gear $R_1$ and the sun gear $S_1$. On the other hand, a cup-shaped member 67 forming the ring gear $R_1$ is formed on its outer circumference with a gear 67a which is meshing with the gear 26 integrated with the internally threaded portion 23. Moreover, a flanged member 70 supporting the pinion pin acting as the carrier $C_1$ is formed on its outer circumference with a gear 70a which is meshing with the gear 24 made rotatable together with the externally threaded portion 22.

On the other hand, the secondary counter shaft 59 is arranged with a planetary gear mechanism 71 like the aforementioned one. This gear mechanism 71 is composed of: a ring gear $R_2$ (to constitute a second member) which is supported rotatably on the counter shaft 59; a carrier $C_2$ (to constitute a first element) which is rotatably supported on the shaft 59; a sun gear $S_2$ (to constitute a third element) which is formed on the shaft 59; and a pinion $P_2$. On the other hand, a cup-shaped member 72 forming the ring gear $R_2$ is formed on its outer circumference with a gear 72a like the aforementioned gear 67a, and this gear 72a is meshing with the gear 51 which is integrated with the internally threaded portion 46. Moreover, a flanged member 75 supporting a pinion pin acting as the carrier $C_2$ is formed on its outer circumference with a gear 75a like the aforementioned gear 70a. This gear 75a is meshing with the gear 52 which is made rotatable together with the external threaded portion 45.

Incidentally, the aforementioned planetary and secondary planetary gear mechanisms 66 and 71 and the gears 24, 26, 70a, 67a, 51, 52, 75a and 72a are so set that the externally threaded portions 22 and 45 and the internally threaded portions 23 and 46 of the ball screw units 21 and 50 may rotate at an equal r.p.m.

With the construction thus made, according to the present embodiment, the rotation of the primary shaft 2 based upon the engine output is transmitted to the stationary race 13 of the pressure regulating cam mechanism 11 and further through the rollers 15 and the movable race 12 to the sheave 9 of the primary pulley 5. At this time, the axial force corresponding to the input torque acting upon the shaft 2 is applied to the back of the sheave 9 on the basis of the relative rotation between the stationary race 13 and the movable race 12 of the pressure regulating cam mechanism 11. Moreover, the torque of the pulley 5 rotating integrally through the ball spline 10 is transmitted through the belt B to the secondary pulley 6 and further through the pressure regulating cam mechanism 43 to the secondary shaft 3. At this time, on the basis of the pressure regulating cam mechanism 43, the axial force corresponding to the output torque transmitted to the secondary shaft 3 is applied to the sheave 35.

On the other hand, the rotation of the primary pulley 5 is transmitted to the externally threaded portion 22 integrated with the movable sheave 7 of the pulley 5 and further to the carrier $C_1$ of the planetary gear mechanism 66 through the gear 24 rotating together with the externally threaded portion 22 and the gear 70a meshing with the gear 24. Moreover, the rotation of the carrier $C_1$ is transmitted through the pinion $P_1$ to the ring gear $R_1$ and further through the gears 67a and 26 to the internally threaded portion 23. Likewise, the rotation of the secondary pulley 6 is transmitted to the externally threaded portion 45 integrated with the movable sheave 33 of the pulley 6 and further to the carrier C₂ of the planetary gear mechanism 71 through the gear 52 rotating integrally with the externally threaded portion 45 and the gear 75a meshing with the gear 52. Still moreover, the rotation of the carrier C₂ is transmitted through the pinion P₂ to the ring gear R₂ and further through the gears 72a and 51 to the internally threaded portion 46.

At this time, the individual planetary gear mechanisms and their gears are set such that the externally threaded portions and the internally threaded portions rotate at the identical r.p.m. In case of no shift by the shift motor M, therefore, the primary and secondary ball screw units 21 and 50 rotate together with the primary and secondary pulleys 5 and 6, without any relative rotation between their externally threaded portions and internally threaded portions, to hold a predetermined torque ratio state. Moreover, since the ball screw units 21 and 50 are rotating together, the thrust bearings 31, 32, 55 and 53 interposed for the shafts 2 and 3 to bear the axial force acting upon the pulleys rotate together. At this time, moreover, the torque caused by the force clamping the belt B is exerted upon the sun gears S₁ and S₂ of the primary and secondary planetary gear mechanisms 66 and 71. However, the shafts 57 and 59 having those sun gears S₁ and S₂ are connected to each other through the non-circular gears 61 and 62 so that the aforementioned torque is canceled. As a result, the counter shafts 57 and 59 are held in a predetermined irrotational state not by any high force but only the holding force of the shift motor M or the like.

When the shift motor M is activated in an accelerating direction by a depression of the accelerator by the driver, the primary counter shaft 57 is rotated in a predetermined direction through the gears 65 and 63 constituting a reduction gear mechanism, and the secondary counter shaft 59 is rotated in the opposite direction through the non-circular gears 61 and 62. Then, the sun gears S₁ and S₂ formed on those counter shafts 57 and 59 are also rotated to change the relative r.p.m. of the carriers C₁ and C₂ and the ring gears R₁ and R₂ of the planetary gear mechanisms 66 and 71. As a result, the externally threaded portions and the internally threaded portions of the individual ball screw units 21 and 50 are rotated relative to each other so that the primary ball screw unit 21 extends whereas the secondary ball screw unit 50 contracts, thus shifting the continuous transmission 1 in the accelerating direction. When the shift motor is rotated in the opposite direction, the externally threaded portions and the internally threaded portions of the individual ball screw units are likewise rotated relative to each other so that the primary ball screw unit 21 contracts whereas the secondary ball screw unit 50 extends, thus shifting the continuous transmission in the decelerating direction.

At this time, the primary ball screw unit 21 is given the relative rotation by the shift motor M through the individual circular gears so that it changes linearly relative to the angle of rotation of the motor M, but the secondary ball screw unit 50 is given the relative rotation through the non-circular gears 61 and 62 so that it changes non-linearly relative to the angle of rotation of the motor M. As a result, the movable sheave 33 of the secondary pulley 6 moves non-linearly relative to the movable sheave 7 of the primary pulley 5 over the individual torque ratios so that it is controlled to match the nonlinear strokes of the two movable sheaves 7 and 33, which are regulated by the belt B. Since the torques in the offset directions act upon the two counter shafts 57 and 59, as described above, the shifting force by the shift motor M can be as low as the difference between the belt clamping forces of the two pulleys 5 and 6 so that it can be controlled quickly and accurately in response to the individual running signals. At the same time, no excessive clamping force is applied to the belt B so that the belt cannot have its durability and transmission efficiency deteriorated. Moreover, the thrust bearings 31, 32, 55 and 53 rotate relative to one another on the basis of the relative rotation of the externally threaded portions 22 and 45 and the internally threaded portions 23 and 46 of the ball screw units 21 and 50, but to a small extent and for a shorter time period than that of the whole power transmission.

Although the foregoing description has been directed to the positive torque transmission from the engine to the wheels, a negative torque transmission can be effected from the wheels to the engine as at an engine braking time. In this negative power transmission, the power can be likewise transmitted by the axial force corresponding to the transmission torque such that the secondary side is at the input whereas the primary side is at the output. At the change from the positive to negative torque transmissions of vice versa, the difference in the directions of rotation instantly establishes an idle state in the pressure regulating cam mechanisms 11 and 43. However, since the pulleys 5 and 6 are given the belt matching characteristics by the nonlinear power transmission means 64, the idle state appears so little that the belt clamping force can always be maintained.

Figure 2:
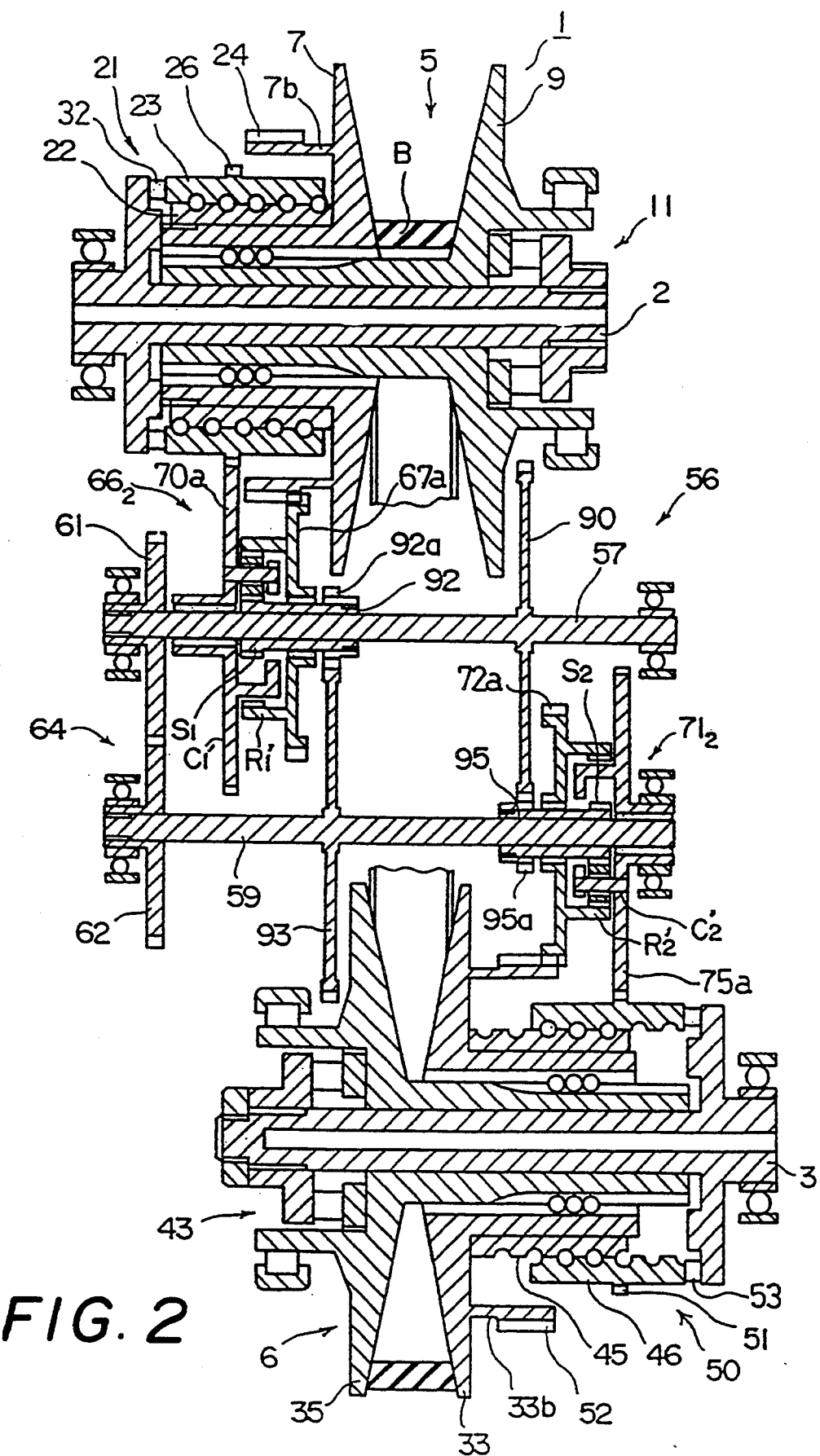
FIG. 2 is a section showing a second embodiment.

Next, a second embodiment of the present invention will be described with reference to FIGS. 2 and 3. Incidentally, the same portions as those of the foregoing embodiment are designated at the identical reference numerals, and their description will be omitted.

In the foregoing embodiment, the gears 24 and 52 rotating together with the externally threaded portions 22 and 45 are fixed on the stationary sheave bosses 9a and 35a. In the present embodiment, on the contrary, the movable sheaves 7 and 33 integrated with the externally threaded portions 22 and 45 are formed at their backs with flanges 7b and 33b which in turn are formed with the wide gears 24 and 52.

Incidentally, in the planetary gear mechanism 66₂ (or 71₂) of the present embodiment, the member, which is connected to the externally threaded portion 22 (or 45) through the gears 24 and 67a (or 52 and 72a), is a ring gear R₁' (or R₂'), and the member, which is connected to the internally threaded portion 23 (or 46) through the gears 26 and 70a (or 51 and 75a), is a carrier C₁' (or C₂'). In the present embodiment, therefore, the first element is the ring gear whereas the second element is the carrier, but the operations are similar to those of the first embodiment.

Moreover, the nonlinear transmission means 64 according to the present embodiment is connected through a reduction unit to the sun gears S₁ and S₂. Specifically, the primary counter gear 57 is formed integrally with a larger gear 90 and and has the non-circular gear 61 fixed thereon, and a sleeve 92 having a smaller gear 92a fixed thereon is rotatably supported on the boss of the sun gear S₁ of the planetary gear mechanism 66. On the other hand, the secondary counter shaft 59 is formed integrally with a larger gear 93 and has the non-circular gear 62 fixed thereon, and the a sleeve 95 having a smaller gear 95a fixed thereon is rotatably supported on the boss of the sun gear $S_2$ of the planetary gear mechanism 71. Moreover, those two non-circular gears 61 and 62 are meshing with each other, and the larger gears 90 and 93 and the smaller gears 92a and 95a are meshing with each other.

Figure 3:
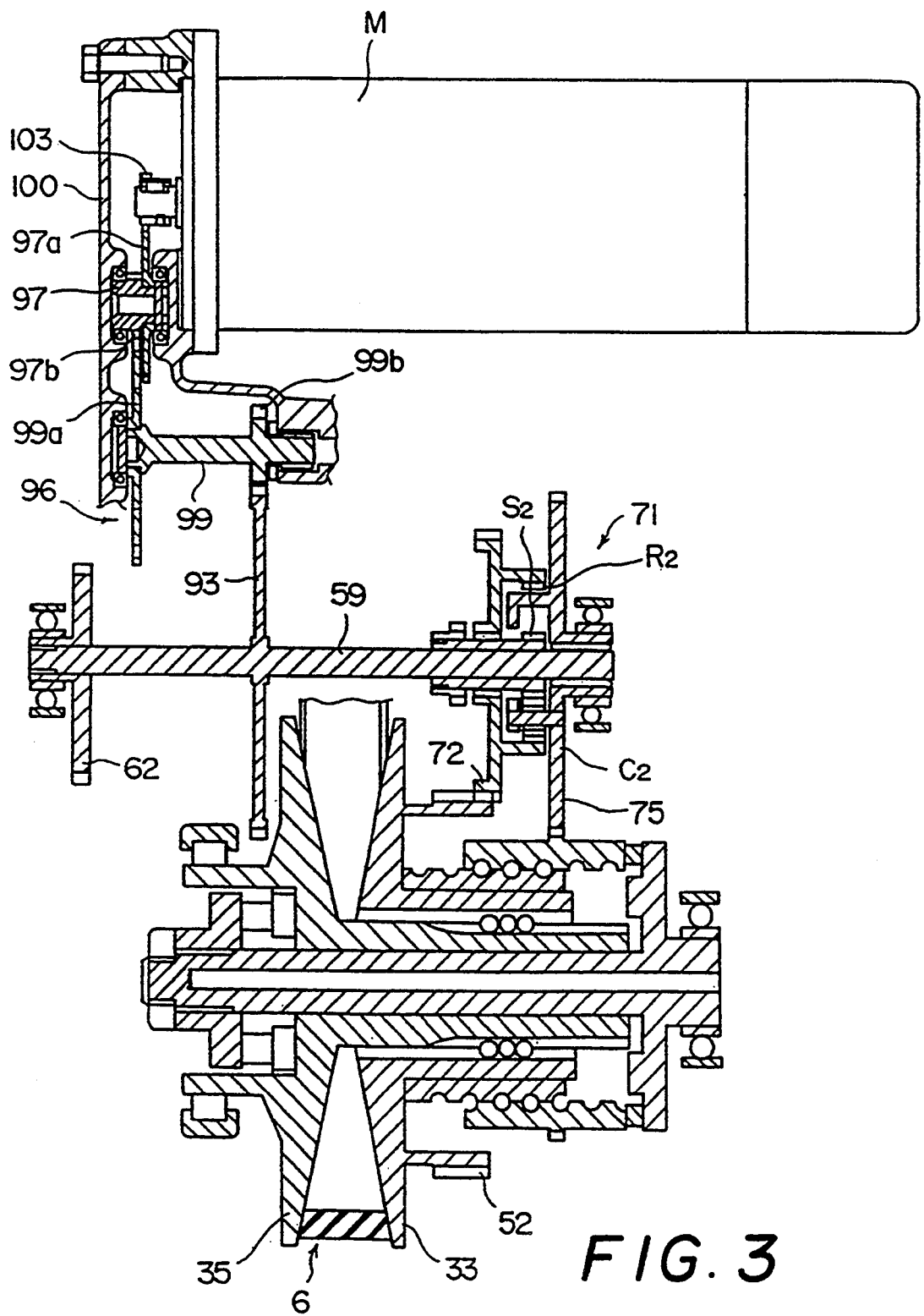
FIG. 3 is a section showing a shift control portion of the second embodiment.

As shown in detail in FIG. 3, moreover, the larger gear 93 of the secondary shaft 59 is associated through a reduction gear train 96 by the shift motor M. Specifically, two shafts 97 and 99 supported by the casing 100 are respectively equipped with larger and smaller gears 97a and 97b, and 99a and 99b. The larger gear 97a of the first shaft 97 is meshing with a smaller gear 103 fixed on the motor output shaft, and the smaller gear 99b of the second shaft 99 is meshing with the larger gear 93 of the counter shaft 59.

With the construction described above, according to the present embodiment, the rotation of the shift motor M has its torque drastically increased through the reduction gear train 96 and transmitted from the gear 93 to the secondary counter shaft 59 and is drastically decelerated through the smaller gear 92a and transmitted to the sun gear $S_1$ of the primary planetary gear mechanism 66. As a result, the externally threaded portion 22 and the internally threaded portion 23 of the primary ball screw unit 21 are rotated relative to each other to change the effective diameter of the pulley 5. On the other hand, the rotation of the secondary counter shaft 59 is turned nonlinear through the non-circular gears 62 and 61 and is drastically decelerated through the primary counter shaft 57, the larger gear 90 and the smaller gear 95a until it is transmitted to the sun gear $S_2$ of the secondary planetary gear mechanism 71. As a result, the externally threaded portion 45 and the internally threaded portion 46 of the secondary ball screw unit 50 are rotated relative to each other to match the nonlinear stroke specified by the belt B on the basis of the aforementioned nonlinear rotation thereby to change the effective diameter of the pulley 6.

Structurally, at this time, the rotations of the non-circular gears 61 and 62 are regulated to one revolution or less but are drastically decelerated relative to each other by the larger gears 90 and 93 and the smaller gears 92a and 95a and transmitted to the sun gears $S_1$ and $S_2$. As a result, the sun gears $S_1$ and $S_2$ rotate many revolutions despite of one or less revolution of the counter shafts 57 and 59 so that the ball screw units 21 and 50 can rotate many revolutions to achieve a predetermined stroke for a predetermined lead.

Figure 4:
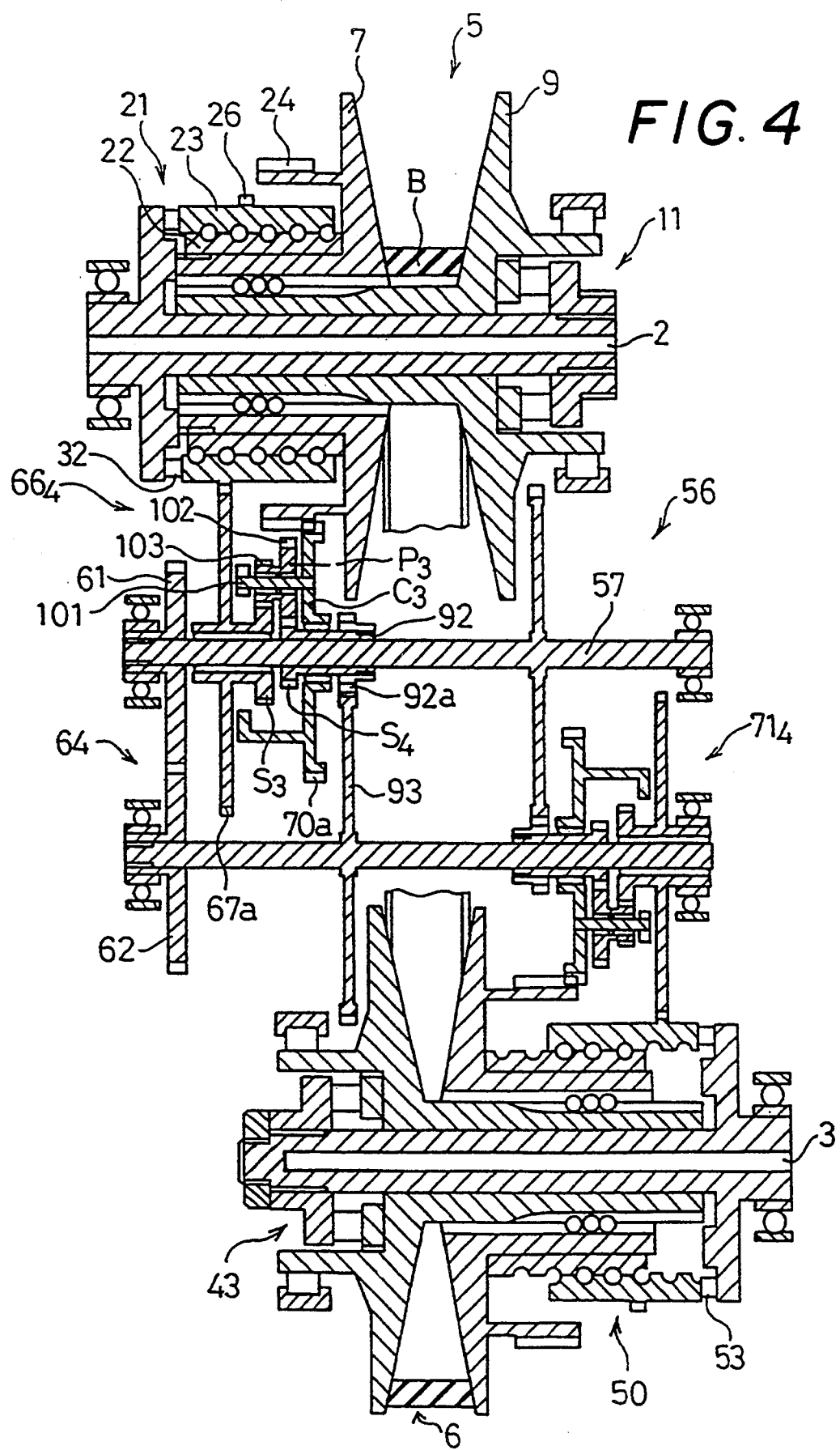
FIG. 4 is a section showing a third embodiment.

Here will be described a third embodiment of the present invention with reference to FIG. 4. Incidentally, the present embodiment is different from the second embodiment only in the planetary gear mechanism, which will be exclusively described. Moreover, the primary side and the secondary side are made to have identical constructions, and the primary side will be exclusively described.

In the planetary gear mechanism $66_4$ (or $71_4$), a pinion $P_3$ supported on the pin 101 of a carrier $C_3$ is composed of a larger gear 102 and a smaller gear 103. Moreover, a first sun gear $S_3$ is meshing with the smaller gear 103 whereas a second sun gear $S_4$ is meshing with the larger gear 102, and the carrier $C_3$ is rotatably borne on the shaft. Still moreover, the first sun gear $S_3$ is rotatably borne on the shaft 57 and is formed integrally with the gear 67a, which is meshing with the gear 26 integrated with the internally threaded portion 23. On the other hand, the second sun gear $S_4$ is formed integrally with the sleeve 92 having the smaller gear 92a, which is connected through the larger gear 93 to the nonlinear transmission means 64. Moreover, the flange constituting the carrier $C_3$ is formed on its outer circumference with the gear 70a, which is meshing with the gear 24 integrated with the movable sheave 7. Thus, the planetary gear mechanism $66_4$ has its carrier $C_3$ constituting the first element, its first sun gear $S_3$ constituting the second element, and its second sun gear $S_4$ constituting the third element.

With the construction thus constructed, according to the present embodiment, the rotation of the pulley 5 is transmitted to the carrier $C_3$ through the gear 24 integrated with the movable sheave 7 and the gear 70a and further from the first sun gear $S_3$ through the gears 67a and 26 to the internally threaded portion 23 on the basis of the second sun gear $S_4$ held in the fixed state. In an unshifted state, the second sun gear $S_4$ is held in the fixed state so that the externally threaded portion 22 and the internally threaded portion 23 are rotated at an equal r.p.m. to hold the pulley 5 in a predetermined shift position.

When the second sun gear $S_4$ is rotated on the basis of the rotation of the shift motor, the externally threaded portion 22 and the internally threaded portion 23 are rotated relative to each other through the first sun gear $S_3$ and the carrier $C_3$ so that the ball screw unit 21 is extended or contracted to change the torque ratio.

Figure 5:
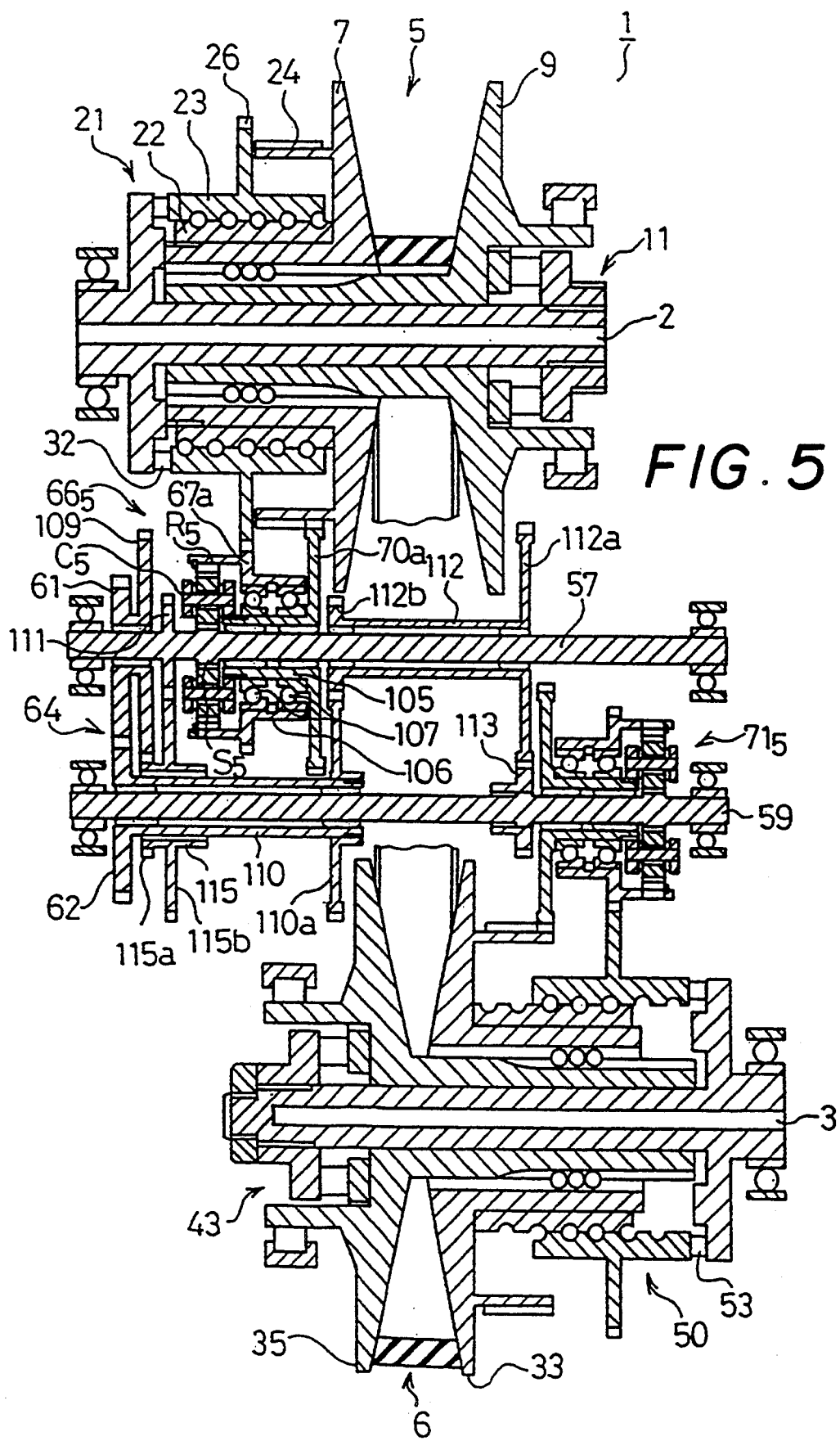
FIG. 5 is a section showing a fourth embodiment.

Here will be described a fourth embodiment of the present invention with reference to FIG. 5. Incidentally, the description of the present embodiment will also be limited to the primary shift control unit.

A planetary gear mechanism $66_5$ (or $71_5$) is composed of; a carrier $C_5$ (to constitute a first element) which is connected to the externally threaded portion 22 through gears 24 and 70a; a ring gear $R_5$ (to constitute a second element) which is connected to the internally threaded portion 23 through gears 26 and 67a; and a sun gear $S_5$ which is formed on the counter shaft 57. The carrier $C_5$ has a boss 105 borne rotatably on the shaft 57, and the ring gear $R_5$ has a drum portion 106. Between the boss 105 and the drum portion 106, there is sandwiched two rows of ball bearings 107 which can bear forces in the radial direction and in the thrust direction.

At the unshifted time, therefore, the ball screw unit 21 has its externally threaded portion 22 and internally threaded portion 23 rotated at the same r.p.m. through the planetary gear mechanism $66_5$ as in the foregoing first embodiment. At this time, the gear thrust forces and the radial forces to be individually exerted upon the power transmission train from the externally threaded portion 22 through the gears 24 and 70a to the carrier $C_5$ and the power transmission train from the internally threaded portion 23 through the gears 26 and 67a to the ring gear $R_5$ are partially offset through the bearing 107.

On the other hand, the non-circular gears 61 and 62 constituting the nonlinear power transmission means 64 are rotatably supported by the counter shafts 57 and 59, respectively. A circular gear 109 is integrally connected to the primary non-circular gear 61, and a circular gear 110a is integrally connected to the secondary non-circular gear 62 through a boss 110. Moreover, a gear 111 is integrally connected to the primary counter shaft 57, and a gear unit 112 composed of a larger gear 112a and a smaller gear 112b is rotatably borne on the primary counter shaft 57. On the secondary counter shaft 59, on the other hand, there is fixed a smaller gear 113. A gear unit 115 composed of a smaller gear 115a and a larger gear 115b is rotatably borne on the secondary counter shaft 59.

As a result, the rotation of the nonlinear transmission means 64 is decelerated at two stages and transmitted to the primary and secondary counter shafts 57 and 59. Specifically, the rotation of the non-circular gear 61 is transmitted through the larger gear 109, the smaller gear 115a and the larger gear 115b of the gear unit 115, and the gear 111 to the primary counter shaft 57. On the other hand, the rotation of the non-circular gear 62 is transmitted through the larger gear 110a, the smaller gear 112b and the larger gear 112a of the gear unit 112 and the smaller gear 113 to the secondary counter shaft 59.

As a result, many revolutions are transmitted to the sun gear $S_5$ by the rotation of the non-circular gears 61 and 62 within one revolution to give a sufficient stroke to the ball screw units 21 and 50.

Figure 6A:
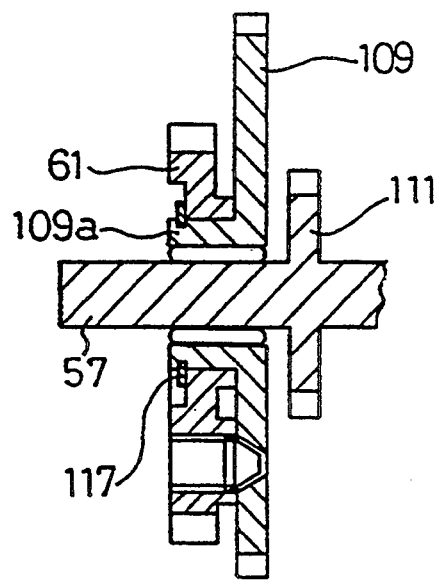
FIG. 6(a) is a longitudinal section showing a phase adjusting device (according to a fifth embodiment) of a non-circular gear, which is partially modified from the fourth embodiment.
Figure 6B:
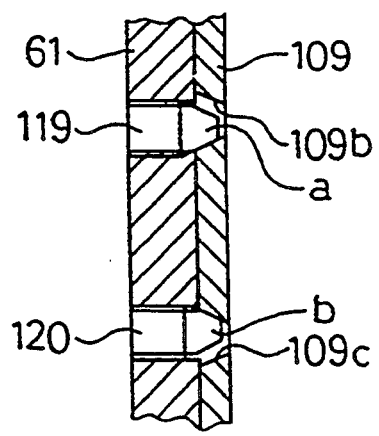
FIG. 6(b) is a partial section showing the same but taken along the circumference.

Next, a fifth embodiment modified slightly from the fourth embodiment shown in FIG. 5 will be described with reference to FIGS. 6(a) and 6(b).

The non-circular gear 61 and the circular gear 109 are integrally connected in the fourth embodiment, but are so connected that their relative positions can be adjusted in the present embodiment. Specifically, the non-circular gear 61 is so mounted on the boss 109a of the circular gear 109 that it may be prevented from coming out by a stopper ring 117. Moreover, the circular gear 109 is formed on its side with two conical holes 109b and 109c, and pins 119 and 120 having tapered faces a and b on their leading ends are driven into the side of the non-circular gear 61 at a pitch slightly smaller than that between the conical holes.

By turning the two pins 119 and 120 to adjust the projections of the tapered faces a and b, the fitted depths of the tapered faces a and b into the conical holes 109b and 109c are adjusted to adjust the phase of the non-circular gear 61 relative to the circular gear 109. As a result, the relative positions of the primary ball screw unit 21 and the secondary ball screw unit 50 can be adjusted to adjust the tension or the like of the belt B.

Figure 7:
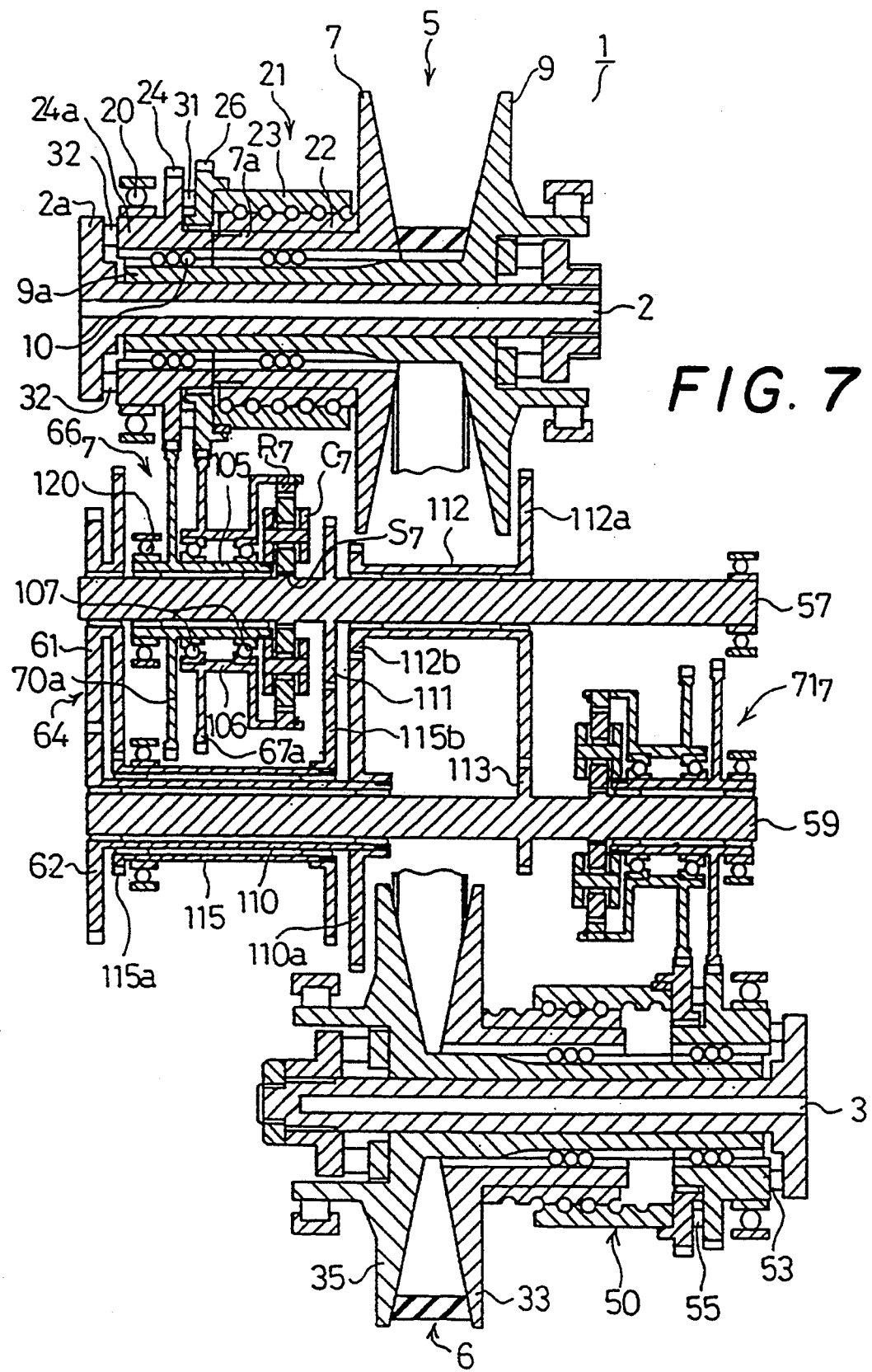
FIG. 7 is a section showing a sixth embodiment which is modified from the fourth embodiment.

Next, a sixth embodiment further modified from the fourth embodiment will be described with reference to FIG. 7. In the present embodiment, too, the same portions as those of the foregoing embodiment are designated, and their description will be omitted. The description will be directed to the primary side only, and the secondary side having an identical construction will not be described.

The boss 9a of the stationary sheave 9 is made slightly longer to support the boss 7a of the movable sheave 7 and the boss 24a of the gear 24 slidably through the ball spline 10. On the gear boss 24a, there is rotatably borne a gear 26, which is coupled integrally rotatably to the internally threaded portion 23. Moreover, the gears 24 and 26 are clamped through the thrust bearings 32 and 31 between the end faces of the shaft bulging portion 2a and the internally threaded portion 23 so that they are held in predetermined axial positions.

On the other hand, a planetary gear mechanism $66_7$ (or $71_7$) is composed of: a carrier $C_7$ (to constitute a first element) which is connected through the gear 70a to the gear 24 rotated together with the externally threaded portion 22; a ring gear $R_7$ (to constitute a second element) which is connected through the gear 67a to the gear 26 rotated together with the internally threaded portion 23; and a sun gear $S_7$ (to constitute a third element) which is formed on the counter shaft 57. Moreover, the gear 70a is connected through the long boss 105 to the carrier $C_7$, and the gear 67a is connected through the drum portion 106 to the ring gear $R_7$. The bearing 107 is sandwiched between those boss 105 and drum portion 106 as in the foregoing embodiments, and the boss 105 is supported by the casing through the bearing 120.

As a result, like the foregoing embodiments, the gear thrust forces and the radial forces of the two trains of the externally threaded portions and the internally threaded portions are offset through the bearing 107, and the planetary mechanism $66_7$ is stably borne through the bearing 120.

Figure 8:
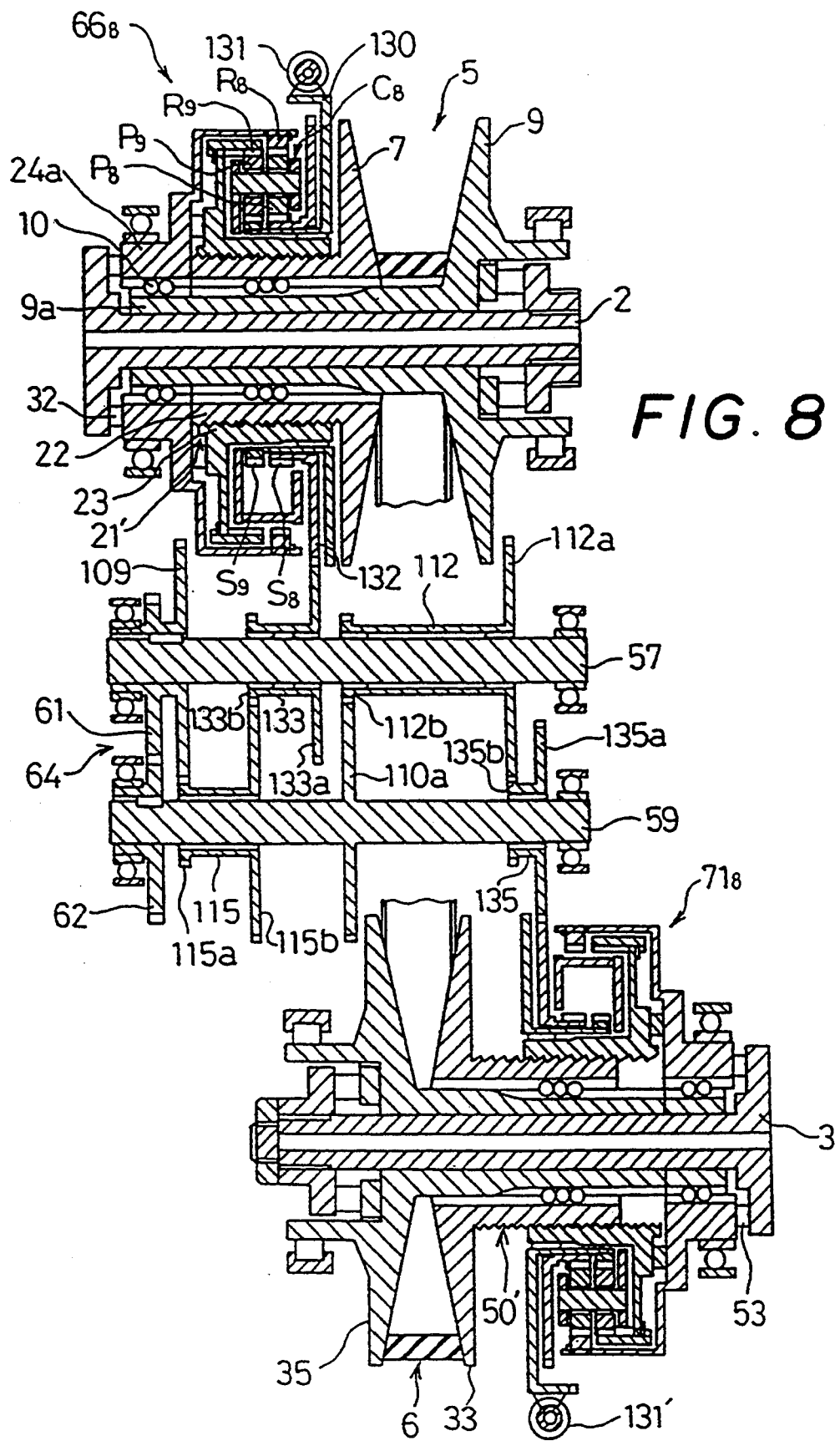
FIG. 8 is a section showing a seventh embodiment.

Here will be described a seventh embodiment of the present invention with reference to FIG. 8. In the present embodiment, too, the description is directed to the primary side only, but the secondary side having an identical construction will not be described.

In the present embodiment, a planetary gear mechanism $66_8$ (or $71_8$) is arranged together with a screw unit 21' (or 50') on the back of the movable sheave 33. Moreover, the screw unit 21' has its diametrical size limited because the planetary gear mechanism is diametrically superposed, and is composed of feed screws having triangular, square or trapezoidal threads.

The planetary gear mechanism $66_8$ is composed of a first ring gear $R_8$ (or a first element), a second ring gear $R_9$ (or a second element), a first sun gear $S_8$ (or a third element), a second sun gear $S_9$, and a carrier $C_8$ supporting first and second pinions $P_8$ and $P_9$. Moreover, the first ring gear $R_8$ is coupled to the gear boss 24a which is integrally connected to the externally threaded portion 22 through the ball spline 10 and the stationary sheave boss 9a, and the second ring gear $R_9$ is connected to the internally threaded portion 23. Still moreover, the secondary sun gear $S_g$ is rotatably borne on the internally threaded portion 23 through the needle bearing and is formed integrally with a worm wheel 130 over a predetermined angle. A worm 131 acting as means for adjusting the belt tension or the like is meshing with the worm wheel 130. The first sun gear $S_8$ is rotatably borne on the boss of the second sun gear $S_9$ and is integrally connected to a larger gear 132. Moreover, the first pinion $P_8$ of the carrier $C_8$ meshes with the first ring gear $R_8$ and the first sun gear $S_8$, and the second pinion $P_9$ meshes with the second ring gear $R_9$ and the second sun gear $S_8$.

On the other hand, the non-circular gears 61 and 62 are respectively coupled to the primary and secondary counter shafts 57 and 59, on which are rotatably supported the reduction gar units 115 and 112. Moreover, a reduction gear unit 133 composed of a larger gear 133a and a smaller gear 133b is rotatably supported on the primary counter shaft 57, on which is fixed the larger gear 109. A reduction gear unit 135 composed of a larger gear 135a and a smaller gear 135b is rotatably borne on the secondary counter shaft 59, on which is fixed the larger gear 110a.

With the construction thus made, according to the present embodiment, the rotation of the externally threaded portion made rotatable together with the pulley 5 is transmitted through the boss 24a to the first ring gear $R_8$ and further to the second ring gear $R_9$ made rotatable together with the carrier $C_8$ on the basis of the first and second sun gears $S_8$ and $S_9$ held in the fixed state, so that the internally threaded portion 23 rotates together with the externally threaded portion 22 at the unshifted time.

When the non-circular gears 61 and 62 are rotated by actuating the shift control means, the rotation of the gear 61 is drastically decelerated through the larger gear 109 and the reduction gear units 115 and 133 and is transmitted to the larger gear 132 to rotate the first sun gear $S_8$ so that the first and second ring gears $R_8$ and $R_9$ are rotated relative to each other. As a result, the externally threaded portion 22 and the internally threaded portion 23 are rotated relative to each other to adjust the screw unit 21' in the axial directions. Likewise, the rotation of the non-circular gear 62 is transmitted through the larger gear 110a and the reduction gear units 122 and 135 to the first sun gear of the secondary planetary gear mechanism $71_8$.

If the worm 131 acting as the regulate means is turned, the second sun gear $S_9$ is rotated to adjust the primary screw unit 21' only so that the primary movable sheave 7 can be moved to adjust the belt tension and the belt running line. If the secondary worm 131' is turned, the secondary movable sheave 33 can be moved. Thus, the optimum belt tension and the belt running line can be achieved by turning those two worms 131 and 131' suitably.

In the embodiments thus far described, the mechanical actuator is exemplified by the ball screw unit or the screw unit but should not be limited thereto. That is, the mechanical actuator may be another unit for converting a rotary motion into an axial motion, such as a screw unit composed of trapezoidal or square screws using the static pressure or a cam mechanism.

In the foregoing embodiments, the nonlinear power transmission unit is used to match the nonlinear stroke specified by the belt of the two movable sheaves but can be eliminated by curving the contact faces of the sheaves to be brought into abutment with the belt.

As has been described hereinbefore, according to the present invention, the two primary and secondary mechanical actuators have their first and second members connected to the predetermined elements of the planetary mechanism and rotated together with the pulleys. As a result, the thrust bearings interposed for bearing the axial forces of the two primary and secondary pulleys on the shafts are rotated together in the unshifted state so that the bearings can have their spin loss eliminated to improve the transmission efficiency and their spaces reduced to make the construction compact or to shorten the axial direction.

For the shifting operation, the third elements of the two primary and secondary planetary gears may be rotated by the shift control means and are connected to each other to cancel the torque to be exerted from the primary pulley and the secondary pulley. As a result, the shift control means may be interrupted or held by a light force so as to maintain a predetermined torque ratio and can be quickly and accurately operated by a light force so as to control the shift.

Moreover, since the two third members are connected through the nonlinear transmission means, the two primary and secondary pulleys can be moved according to the nonlinear stroke specified by the belt so that the belt clamping force can be maintained at an optimum level irrespective of the torque ratio. At the same time, the torque fluctuation at the time of changing the torque transmission direction can be reduced to lighten the transmission shock and to improve the durability of the continuous transmission.

What is claimed is:

1. A continuous V-belt transmission comprising: a primary pulley and a secondary pulley individually including two sheaves supported on shafts and made axially movable relative to each other; a belt made to run on said two pulleys; mechanical actuators individually including first members and second members for moving the movable sheaves of said two pulleys on the basis of the relative rotations of said two members; and pressure regulating mechanisms for applying an axial force corresponding to a transmission torque to at least one of said pulleys, wherein said primary pulley has its movable sheave connected axially movably but relatively unrotatably to said stationary sheave and its one of said movable sheave and said stationary sheave connected rotatably together to one of the first and second members of said primary mechanical actuator, wherein said secondary pulley has its movable sheave connected axially movably but relatively unrotatably to said stationary sheave and its one of said movable sheave and said stationary sheave connected rotatably together to one of the first and second members of said secondary mechanical actuator, wherein there are arranged planetary gear mechanisms individually including first elements, second elements and third elements, wherein said primary planetary gear mechanism has its first element connected to one of the first member and the second member of said primary mechanical actuator and its second element connected to the other of said mechanical actuator so that the first and second members of said mechanical actuator may rotate at the same r.p.m. when said planetary gear mechanism has its third element in the stop state, wherein said secondary planetary gear mechanism has its first element connected to one of the first member and the second member of said secondary mechanical actuator and its second element connected to the other of said mechanical actuator so that the first and second members of said mechanical actuator may rotate at the same r.p.m. when said planetary gear mechanism has its third element is in the stop state, and wherein said primary planetary gear mechanism and said secondary planetary gear mechanism have their third elements connected to each other and to shift control means.

2. A continuous V-belt transmission according to claim 1, wherein said primary planetary gear mechanism and said secondary planetary gear mechanism have their third elements connected to each other through nonlinear power transmission means.

* * * * *

UNITED STATES PATENT AND TRADEMARK OFFICE
CERTIFICATE OF CORRECTION

PATENT NO. : 5,378,198
DATED : January 3, 1995
INVENTOR(S) : Moroto, et al

It is certified that error appears in the above-indentified patent and that said Letters Patent is hereby corrected as shown below:

In the Abstract, line 16, delete "toe" and insert --two--.

Column 1, line 64, "sate" should read --state--.

Column 2, line 16, "lose" should read --loss--.

Column 3, line 38, delete "pully" insert --pulley--; and
         line 39, delete "pully" insert --pulley--.

Column 6, line 6, after "$C_1$" insert --and--.

Column 12, line 38, "$S_g$" should read --$S_9$--; and
         line 53, "gar" should read --gear--.

Signed and Sealed this

Twenty-fourth Day of October, 1995

BRUCE LEHMAN

*Attest:*

*Attesting Officer*         *Commissioner of Patents and Trademarks*